No. 853,059. PATENTED MAY 7, 1907.
J. H. O. BUNGE.
STUFFING BOX.
APPLICATION FILED JUNE 14, 1906.
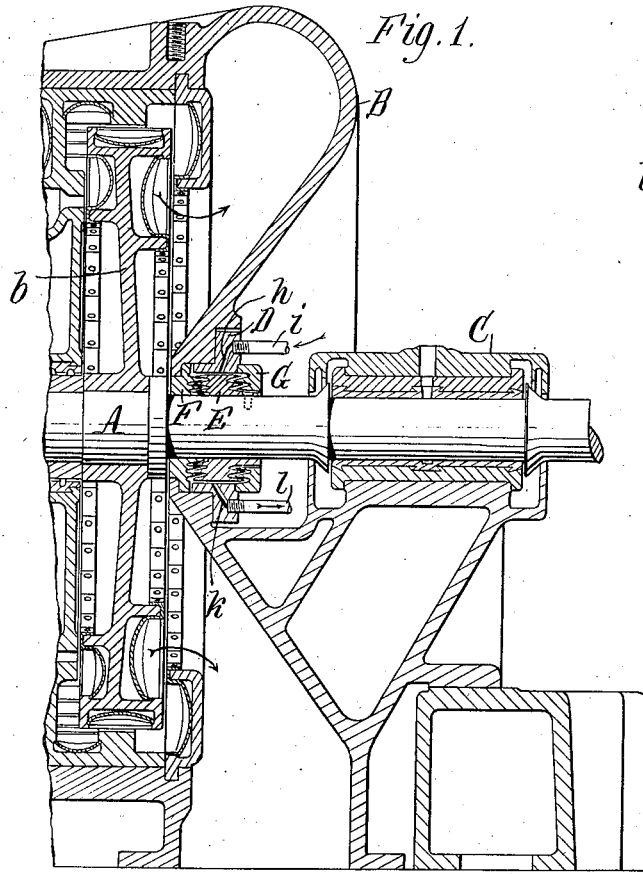
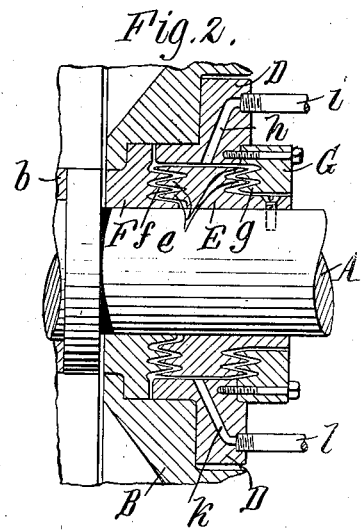
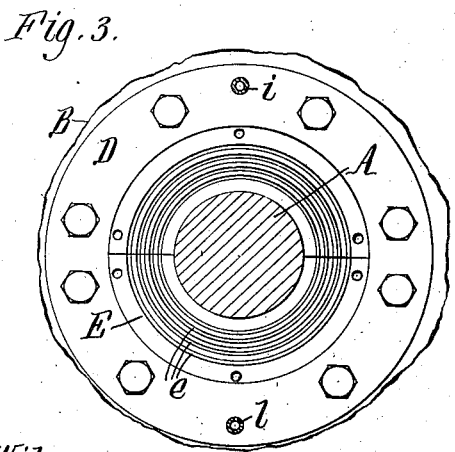
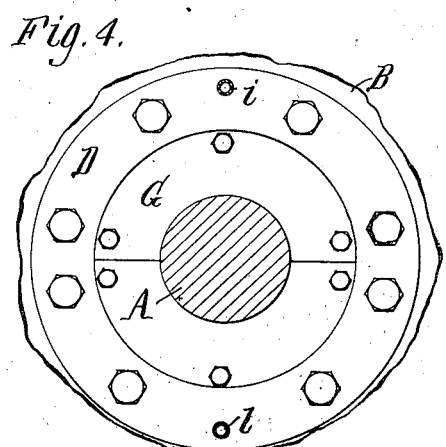
Witnesses:
A. G. Dimond
E. A. Vock
Inventor.
Julius H. O. Bunge
By Wilhelm, Parker & Hard
Attorneys.

UNITED STATES PATENT OFFICE.

JULIUS H. O. BUNGE, OF BUFFALO, NEW YORK.

STUFFING-BOX.

No. 853,059. Specification of Letters Patent. Patented May 7, 1907.

Original application filed February 14, 1906, Serial No. 300,972. Divided and this application filed June 14, 1906. Serial No. 321,591.

*To all whom it may concern:*

Be it known that I, JULIUS H. O. BUNGE, a subject of the Queen of the Netherlands, residing at Buffalo, in the county of Erie and State of New York, have invented a new and useful Improvement in Stuffing Boxes, of which the following is a specification, this application being a division of my application filed February 14, 1906, Serial No. 300,972.

This invention relates to that class of stuffing boxes for rotary shafts which are packed by a body of fluid contained between a stationary casing and a rotary member arranged therein and mounted on the shaft, the casing and the rotary member being provided with intermeshing annular projections which are separated by a sinuous or zig-zag passage which is filled with said fluid. Heretofore these intermeshing annular projections have been arranged radially and side by side so that the sinuous or zig-zag passage formed between these projections extended along the shaft, while the individual legs of this passage were arranged radially and extended alternately away from the shaft and toward the same. The object of this invention is to produce a more compact and more efficient packing or stuffing box of this character.
In the accompanying drawings: Figure 1 is a sectional elevation of the exhaust end of a steam turbine provided with my improved stuffing box. Fig. 2 is a longitudinal section of the box, on an enlarged scale. Fig. 3 is a front elevation of the box with the gland removed. Fig. 4 is a front elevation of the box.

Like letters of reference refer to like parts in the several figures.

A represents the rotary shaft to which the stuffing box is applied and which, in the machine shown in the drawings, is the shaft of a steam turbine but which may be the shaft of any other machine in which leakage along the shaft is to be prevented.

B represents the casing of the turbine, b the bucket wheels, and C one of the bearings.

The stuffing box comprises a box or casing D which is secured to the casing B of the turbine or other machine, a collar E which is secured to the shaft to rotate therewith within the box D, a bottom ring F which is arranged at the inner end of the box D, and a gland or cover G which is secured to the outer end thereof. This collar is provided at both ends with concentric annular projections e which extend axially into spaces between similar annular projections f and g formed, respectively, on the outer side of the bottom ring F and the inner side of the gland G. These annular projections intermesh or fit between each other with a slight clearance, sufficient to prevent contact, and this clearance forms a zig-zag or sinuous passage between each end of the rotary collar and the adjacent non-rotary member of the stuffing box. This clearance is preferably somewhat greater lengthwise of the shaft than radially and the annular projections taper preferably from the base toward the edge.

Steam or some other fluid under pressure is supplied to the sinuous passages for the purpose of keeping the same filled with a fluid which is under sufficient pressure to prevent leakage along the shaft. In the case of a steam turbine steam is most conveniently used as the pressure fluid and this steam is supplied to the sinuous passages of the box by a port h formed in the box and a supply pipe i connected therewith. The water of condensation is discharged from the sinuous passages by a port k formed in the box and a waste pipe l, which may lead to a trap of any suitable construction.

The steam or other fluid under pressure fills the sinuous passages between the rotary collar and the non-rotary parts of the box but is driven away from the shaft by the centrifugal force which is created by the rotation of the collar and its annular projections This centrifugal action and the friction which the steam or other pressure fluid encounters in the narrow sinuous passages result in a practical equilibrium of pressure around the shaft, whereby leakage of steam along the shaft is prevented from the inside of the turbine casing at the front or high pressure end of the casing, or of outside air to the inside of the casing at the exhaust or vacuum end thereof.

Each zig-zag passage comprises several legs which are arranged concentrically, each outer leg farther from the shaft than the next inner one and each trending lengthwise of the shaft with a certain amount of obliquity. The intermeshing rings on the stationary casing and the rotary member are tapering in cross section and form adjacent to the edge or apex of each ring an enlarged chamber or pocket which accommodates more of the sealing fluid than the friction in the narrow spaces between the sides of the rings will allow to pass. The fluid expands in these chambers and the pressure of the fluid in successive legs of the passage is thereby greatly reduced and the flow correspondingly retarded. This action is cumulative to that produced by the friction of the fluid against the confining walls.

The concentric arrangement of the individual legs of the zig-zag passage reduces the length of the packing space to that occupied by one of the legs, and the lengthwise trend of the friction surfaces causes the fluid to be massed in each leg by centrifugal force against one of these surfaces, whereby the frictional resistance to the movement of the fluid is greatly increased.

I claim as my invention:

1. In a stuffing box, the combination of a stationary and a rotary member, each provided with concentric rings which project lengthwise with reference to the axis of the rotary member, the rings of the two members intermeshing and being separated by a zig-zag passage composed of legs which are arranged concentrically, each outer leg further from said axis than the next inner leg, substantially as set forth.

2. In a stuffing box, the combination of a stationary member and a rotary member, each provided with concentric rings trending lengthwise of the axis of the rotary member, the rings of the two members intermeshing and being separated by a zig-zag passage having enlarged chambers adjacent to the free ends of the rings, substantially as set forth.

3. In a stuffing box, the combination of a stationary member and a rotary member, each provided with concentric, tapering rings, the rings of the two members intermeshing and being separated by a zig-zag passage having enlarged chambers adjacent to the free ends of the rings, substantially as set forth.

Witness my hand this 6th day of May, 1906.

JULIUS H. O. BUNGE.

Witnesses:
C. W. PARKER,
C. B. HORNBECK.